United States Patent
Brownrigg, Jr.

(10) Patent No.: US 8,239,573 B2
(45) Date of Patent: Aug. 7, 2012

(54) OFF-PEAK BACKGROUND DELIVERY

(75) Inventor: Richard T. Brownrigg, Jr., Castle Rock, CO (US)

(73) Assignee: Starz Entertainment, LLC, Englewood, CO (US)

( * ) Notice: Subject to any disclaimer, the term of this patent is extended or adjusted under 35 U.S.C. 154(b) by 122 days.

(21) Appl. No.: 11/956,573

(22) Filed: Dec. 14, 2007

(65) Prior Publication Data

US 2009/0006599 A1    Jan. 1, 2009

Related U.S. Application Data

(60) Provisional application No. 60/870,112, filed on Dec. 15, 2006.

(51) Int. Cl.
*G06F 15/173* (2006.01)
*G06F 15/16* (2006.01)
*H04N 7/173* (2006.01)

(52) U.S. Cl. .......... 709/241; 709/201; 709/203; 725/96; 725/97

(58) Field of Classification Search ............ 709/241
See application file for complete search history.

(56) References Cited

U.S. PATENT DOCUMENTS

| | | | |
|---|---|---|---|
| 6,785,704 B1 * | 8/2004 | McCanne | 709/239 |
| 7,272,842 B2 * | 9/2007 | Kay et al. | 725/1 |
| 7,568,046 B2 * | 7/2009 | Allen | 709/233 |
| 2005/0216942 A1 * | 9/2005 | Barton | 725/97 |
| 2007/0016688 A1 * | 1/2007 | Hester et al. | 709/238 |

\* cited by examiner

*Primary Examiner* — Hieu Hoang
*Assistant Examiner* — Neeraj Utreja
(74) *Attorney, Agent, or Firm* — Kilpatrick Townsend & Stockton LLP

(57) ABSTRACT

Methods, systems, and machine readable media are disclosed for managing bandwidth utilization including off-peak, background delivery of content. According to one embodiment, a method of managing bandwidth used for delivering content to a plurality of users can comprise determining one or more destinations for the content and determining available bandwidth for delivering the content to the one or more destinations. A set of criteria can be applied to the content, the one or more destinations for the content, and the available bandwidth. A schedule for delivery of the content can be generated based on applying the set of criteria. The content can be delivered to the one or more destinations based on the schedule.

27 Claims, 5 Drawing Sheets

OFF-PEAK BACKGROUND DELIVERY

CROSS-REFERENCES TO RELATED APPLICATIONS

This application claims the benefit of U.S. Provisional Application No. 60/870,112, filed Dec. 15, 2006, entitled OFF-PEAK BACKGROUND DELIVERY, the complete disclosures of which is incorporated herein by reference for all purposes.

BACKGROUND OF THE INVENTION

Embodiments of the present invention relate generally to distribution of content and more particularly to off-peak, background delivery of content.

A content provider can make audio, video, and/or other media content available on a real-time basis, i.e., for immediate or near immediate download and consumption. So, a user can request a specific piece of content and view, listen to, or otherwise consume the content as it is being received. Additionally, a content provider can make content available on a non-real-time basis. In such a case, the user can request, download, and save the content for later consumption. Such downloads can be made on a scheduled basis, on an "as-available" basis, or on some other arrangement wherein the content is provided at some time later than the request. For example, such downloads may be made during off-peak hours when additional bandwidth is available, i.e., there are fewer real-time users. However, even during these off-peak hours, real-time users expect, and in fact may have agreements specifying, a minimum QoS.

Additionally, if the combined bandwidth used by the real-time downloads and the scheduled or background downloads exceeds some specified amount, the content provider may be subject to additional charges or fees for bandwidth usage. Conversely, bandwidth that has been paid for but that is not being utilized is wasted. Thus, content providers attempt to maintain a balance between providing a certain QoS for real-time users and preventing additional charges for excessive bandwidth usage.

Existing methods of maintaining this balance involve scheduling non-real-time use during off-peak hours and setting a hard limit for the total bandwidth utilized at any given time. That is, non-real-time use or downloads are placed into a delivery queue to be played out or delivered during known off-peak periods, e.g., overnight, and are delivered as soon as possible within the scheduled period and within the limits imposed on bandwidth utilization. However, such an approach is rather inflexible and fails to take into consideration factors other than the total bandwidth utilization. Hence, there is a need in the art for improved methods and systems for managing bandwidth utilization.

BRIEF SUMMARY OF THE INVENTION

Methods, systems, and machine readable media are disclosed for managing bandwidth utilization including off-peak, background delivery of content. According to one embodiment, a method of managing bandwidth used for delivering content to a plurality of users can comprise determining one or more destinations for the content and determining available bandwidth for delivering the content to the one or more destinations. In some cases, prior to determining the one or more destinations for the content, the content can be received from a content source such as a Content Delivery Network (CDN). A set of criteria can be applied to the content, the one or more destinations for the content, and the available bandwidth. A schedule for delivery of the content can be generated based on applying the set of criteria. The content can be delivered to the one or more destinations based on the schedule.

For example, the criteria can comprise a predetermined limit for utilization of total bandwidth. In another example, the criteria can comprise a priority associated with at least one of the one or more destinations. In such cases, the priority can be based at least in part on a business relationship with an entity associated with the at least one destination. Additionally or alternatively, the priority can be based at least in part on an entity associated with the at least one destination paying a premium or receiving a discount for delivery of the content. In some cases, the set of criteria can comprise primary criteria and secondary criteria. For example, the predetermined limit for utilization of total bandwidth can comprise a primary criteria and the priority associated with the at least one destination can comprise a secondary criteria.

In some implementations, while delivering the content to the one or more destinations, a current total amount of bandwidth used by both active users and inactive users of the plurality of users can be determined. The active users can be those users utilizing the content in real-time and the inactive users can be those users not utilizing the content in real-time. In response to the current total amount of bandwidth exceeding a predetermined level, downloads to destinations associated with either the inactive users or active users can be throttled based on the criteria. In response to the current total amount of bandwidth not exceeding the predetermined level, the content can be delivered to additional destinations based on the schedule. After throttling downloads, a new current total amount of bandwidth can be determined. In response to the new current total amount of bandwidth falling below the predetermined level, downloads can be resumed or added.

According to another embodiment, a system can comprise a content source, such as a Content Delivery Network (CDN), one or more content destinations, and a bandwidth management module communicatively coupled with the content source and the one or more content destinations. The bandwidth management module can be adapted to receive the content from the content source, identify the one or more destinations for the content, determine available bandwidth for delivering the content to the one or more destinations, apply a set of criteria to the content, the one or more destinations for the content, and the available bandwidth, generate a schedule for delivery of the content based on applying the set of criteria, and deliver the content to the one or more destinations based on the schedule.

For example, the criteria can comprise a predetermined limit for utilization of total bandwidth. In another example, the criteria can comprise a priority associated with at least one of the one or more destinations. In such cases, the priority can be based at least in part on a business relationship with an entity associated with the at least one destination. Additionally or alternatively, the priority can be based at least in part on an entity associated with the at least one destination paying a premium or receiving a discount for delivery of the content.

According to yet another embodiment, a machine-readable medium can have stored thereon a series of instructions which, when executed by a processor, causes the processor to manage bandwidth used for delivering content to a plurality of users by determining one or more destinations for the content, determining available bandwidth for delivering the content to the one or more destinations, applying a set of criteria to the content, the one or more destinations for the content, and the available bandwidth, and generating a schedule for delivery of the content based on applying the set of criteria. The content can be delivered to the one or more destinations based on the schedule.

For example, the criteria can comprise a predetermined limit for utilization of total bandwidth. In another example, the criteria can comprise a priority associated with at least one of the one or more destinations. In such cases, the priority can be based at least in part on a business relationship with an entity associated with the at least one destination. Additionally or alternatively, the priority can be based at least in part on an entity associated with the at least one destination paying a premium or receiving a discount for delivery of the content.

In some implementations, while delivering the content to the one or more destinations, a current total amount of bandwidth used by both active users and inactive users of the plurality of users can be determined. The active users can be those users utilizing the content in real-time and the inactive users can be those users not utilizing the content in real-time. In response to the current total amount of bandwidth exceeding a predetermined level, downloads to destinations associated with the inactive users can be throttled. In response to the current total amount of bandwidth not exceeding the predetermined level, the content can be delivered to additional destinations based on the schedule. After throttling downloads to the destinations associated with inactive users, a new current total amount of bandwidth can be determined. In response to the new current total amount of bandwidth falling below the predetermined level, downloads to the destinations associated with inactive users can be resumed.

DETAILED DESCRIPTION OF THE INVENTION

Figure 1:
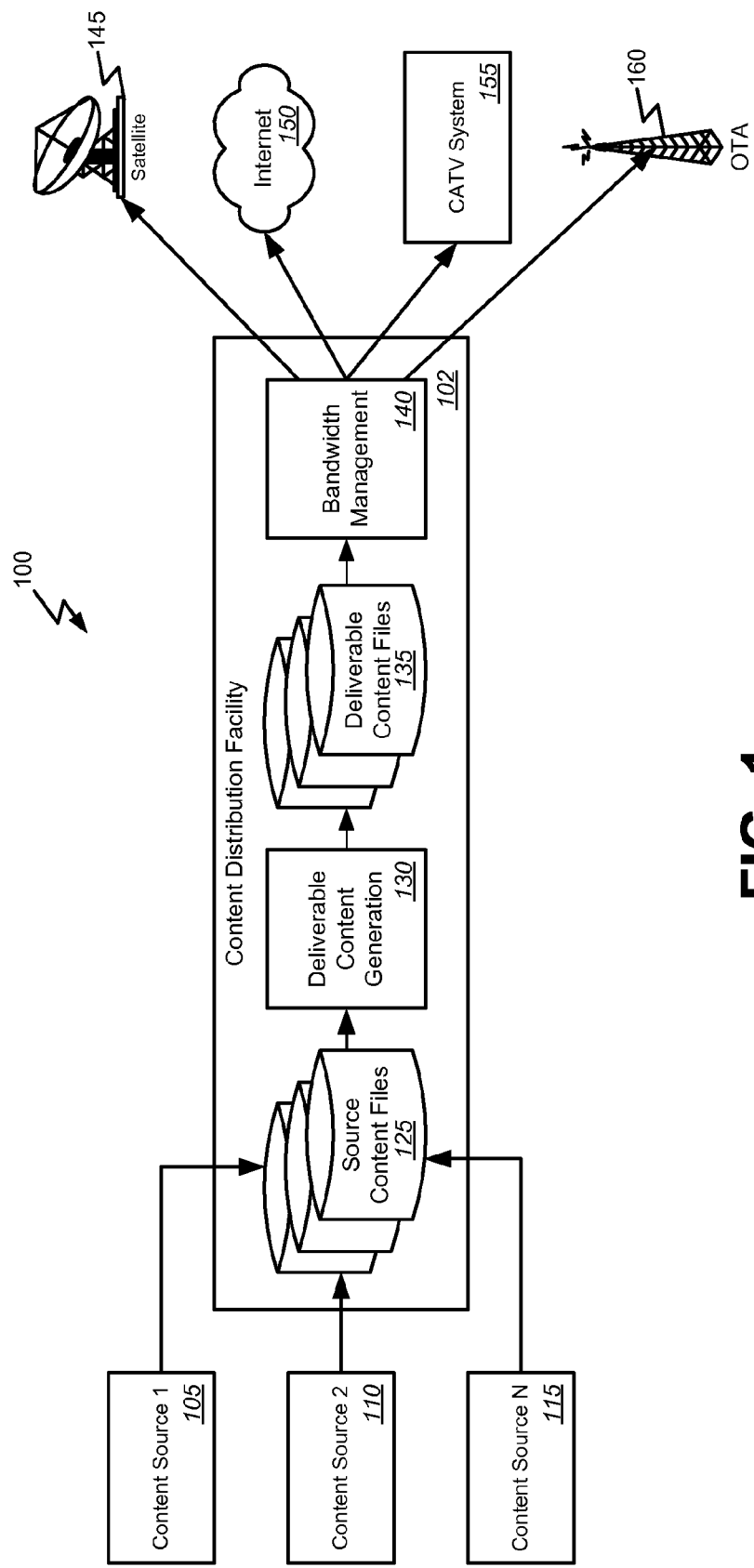
FIG. 1 is a block diagram illustrating components of an exemplary content distribution system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Generally speaking, embodiments of the invention provide methods and systems for managing bandwidth utilization when delivering content to a number of subscribers or users while considering Quality of Service (QoS) and/or other aspects of a customer or user experience as well as bandwidth costs to the content provider. For example, embodiments of the present invention may be useful for a provider of audio, video, and/or other multimedia content to a number of users and/or subscribers. More specifically, embodiments of the present invention comprise sever-side processes that manage bandwidth utilization based on the content to be delivered, the destination or destinations to which that content is to be delivered, and the available bandwidth for that delivery. Based on these consideration, as well as other possible criteria as will be described in detail below, delivery of content can be scheduled to utilize the available bandwidth while controlling costs to the content provider and maintaining a QoS or other customer experience criteria.

Embodiments of the present invention can also provide for throttling or activating non-live, i.e., background, delivery of content to achieve a predetermined level of bandwidth utilization, for example 95% utilization. The predetermined level of bandwidth utilization can be set to help maintain a QoS level for live delivery of content and/or to avoid additional costs to the content provider system for additional bandwidth usage. According to one embodiment, the level may be static, i.e., can be set to a specific level. Such a setting may be used, for example, by a content provider with a relatively flat or constant, and therefore predictable level of demand. Alternatively, the predetermined level may be dynamically set periodically or upon the occurrence of some event based on recent and/or historical usage. That is, the predetermined level may be adjusted based on usage over time. Such a level may be useful for content providers that experience changing demand because of various events such as new releases, specials, user habits, etc. Additional details of the various embodiments of the present invention will be provided below and described with reference to the figures.

FIG. 1 is a block diagram illustrating components of an exemplary content distribution system in which various embodiments of the present invention may be implemented. In this example, the system 100 includes a number of content sources 105-115 that can supply multi-media content to content distribution facility 102. For example, the content sources 105-115 can provide movies, television programs, audio programs, etc. to the content distribution facility. This content can be communicated to the content distribution facility by any of a number of communication media including but not limited to satellite transmissions, the Internet or other communications network, over-the-air transmission, etc.

Generally speaking, the content distribution facility 102 can store the multi-media content provided by the content sources 105-115 and redistribute the content to a number of subscribers or users via any of a variety of channels including but not limited to satellite 145 transmissions, the Internet 150 or other communication network, a cable television system 155, over-the-air 160 transmissions, etc. The content distribution facility 102 can be adapted to convert multi-media content to multiple deliverable formats for delivery to the subscribers or users via the various channels 145-160.

The content distribution facility 102 can include a source content file repository 125 in which source content files provided by the content sources 105-115 can be stored. A deliverable content generation module 130 can be adapted to read the source content files and generate a number of different deliverable content files to be stored in a deliverable content file repository 135. That is, the deliverable content generation module 130 can be adapted to convert multi-media content from the source content file repository to multiple deliverable formats specific to the different distribution channels 145-160.

According to one embodiment, the content distribution facility can include a bandwidth management system or module 140. It should be noted that, while illustrated here as part of the content distribution facility 102, in other implementations the bandwidth management system 140 can be external to or separate from the content distribution facility 102. Generally speaking, the bandwidth management system 140 can manage bandwidth utilization when delivering content to a number of destinations via the different distribution channels 145-160 while considering Quality of Service (QoS) and/or other aspects of a customer or user experience as well as bandwidth costs to the content provider. That is, the bandwidth management system 140 can be adapted to manage bandwidth utilization based on the content to be delivered, the destination or destinations to which that content is to be delivered, and the available bandwidth for that delivery.

Figure 2:
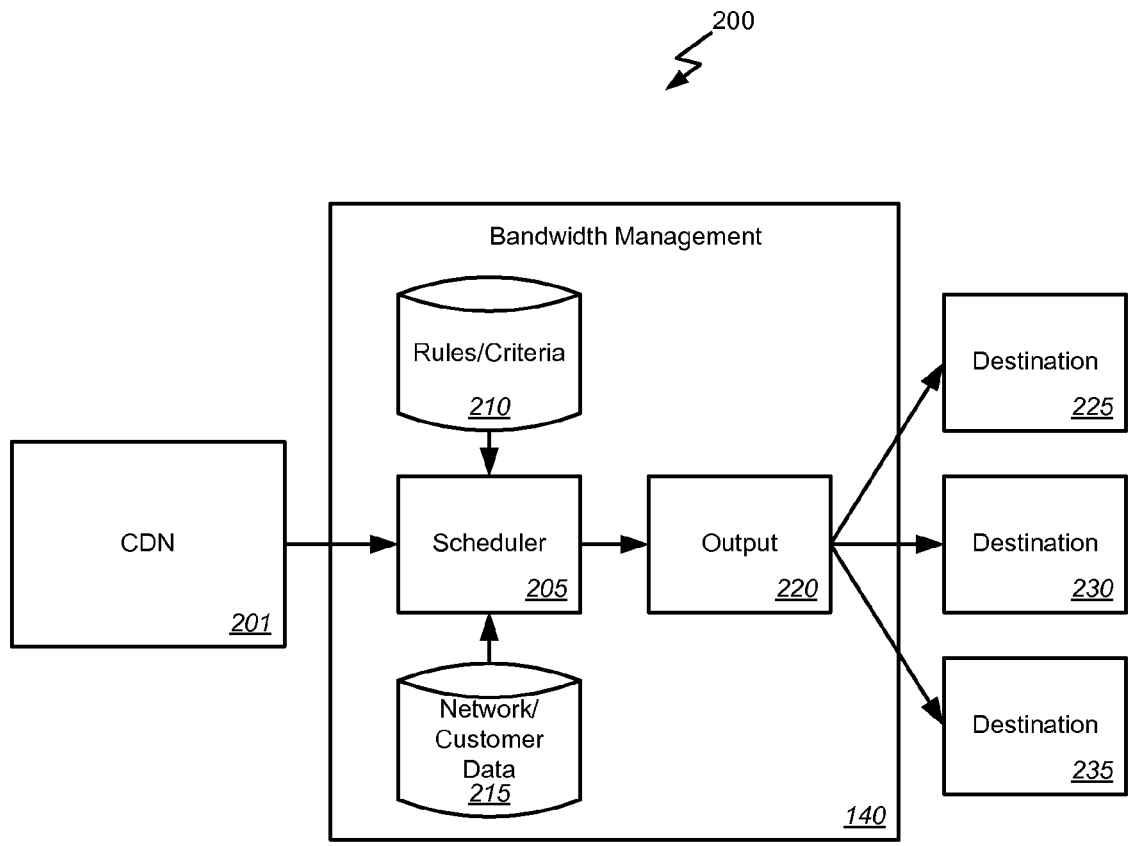
FIG. 2 is a block diagram illustrating additional elements of an exemplary bandwidth management system according to one embodiment of the present invention.

FIG. 2 is a block diagram illustrating additional elements of an exemplary bandwidth management system according to one embodiment of the present invention. As illustrated here, the system 200 can comprise a content source, such as a Content Delivery Network (CDN) 201. It should be understood that the CDN 201 can represent a content delivery facility 102 as described above with reference to FIG. 1 or another content distribution system and/or network. The system 200 can also include a bandwidth management system 140 or module communicatively coupled with the CDN 102. As noted above, the bandwidth management system 140 may be part of the CDN 102 or separate from the CDN 102 and communicatively coupled with the CDN 102 via the Internet or any other wide area or local area network as known in the art. The system 200 can also include one or more content destinations 225-235 communicatively coupled with the bandwidth management module 140. The content destinations 225-235 can be communicatively coupled with the bandwidth management module 140 via any one or more of a variety of communication channels as described above with reference to FIG. 1.

The bandwidth management module 140 can include, for example, a scheduler 205 and an output module 220. The bandwidth management module 140 can be adapted to receive content from the CDN 102 and generate a schedule, for example via scheduler module 205, for playing out the content, for example via the output module 220. The bandwidth management module 140 can also include a rules or criteria repository 210 and a network and/or customer data repository 215. It should be noted that, while illustrated here as separate repositories 210 and 215 maintained within the bandwidth management module 140, the repositories 210 and 215 may alternatively be implemented in a single repository either within or external to but accessible by the bandwidth management module 140. Regardless of exactly how the repositories 210 and 215 are implemented, the repositories 210 and 215 can maintain a set of rules or criteria, i.e., business logic, and a set of network and/or customer data related to the destinations 225-235. Based one these criteria and data as well as the content to be delivered and the destinations to which the content will be delivered, the scheduler module 205 can generate a schedule for delivering the content. Stated another way, the bandwidth management module 140 can be adapted to receive the content from the CDN 102, identify the one or more destinations 225-235 for the content, determine available bandwidth for delivering the content to the one or more destinations 225-235, apply a set of rules or criteria to the content, the one or more destinations for the content, and the available bandwidth, generate a schedule for delivery of the content based on applying the set of criteria, and deliver the content to the one or more destinations based on the schedule.

The rules or criteria maintained in the criteria repository 210 can comprise, for example, a predetermined limit for utilization of total bandwidth, e.g., 95%, various business rules defining how content should be scheduled in order to maintain bandwidth utilization levels, and possibly other criteria. For example, such rules can define a particular order, manner, time, etc. in which content should be delivered and may be based on the destination and/or customer associated with that destination as well as the content itself, e.g., the type of content, the size of the content, etc.

The network and/or customer data repository 215 can maintain information related to the one or more destinations 225-235 and customers or subscribers associated therewith. The network and/or customer data repository 215 can additionally or alternatively maintain information related to the networks or channels over which content is delivered to the various destinations 225-235. For example, the network and/or customer data repository 215 can maintain information related to available bandwidth to a particular destination, subscriber information for a particular user or destination, pricing or other business information related to that customer or destination, etc. It should be understood that such information can be dynamic in nature and can be updated periodically or upon the occurrence of some event. For example, available bandwidth information related to a channel or destination can be based on known or estimated available bandwidth, e.g., based on the channel, protocol, equipment, etc., but may be updated based on historical results of communications with that destination. In another example, customer information can be updated to reflect discounts given to or premiums paid by a customer associated with a particular destination.

According to one embodiment, a priority can be associated with at least one of the one or more destinations 225-235 by the scheduler module 205 based on the rules or criteria and/or the network or customer data. The priority can be based at least in part on a business relationship with an entity associated with the at least one destination. Additionally or alternatively, the priority can be based at least in part on an entity associated with the at least one destination paying a premium or receiving a discount for delivery of the content. Therefore, a delivery of a particular content item to a particular destination can be moved ahead or back in the schedule based on the priority assigned thereto which in turn can be based on the rules, customer information, network information, etc. For example, a particular customer associated with a particular destination may be assigned a high priority based on a business relationship with that customer. In another example, a particular customer associated with a particular destination may be assigned a high priority based on that customer agreeing to pay a premium for earlier or even immediate delivery of the content. In yet another example, a particular customer associated with a particular destination may be assigned a low priority based on that customer agreeing to receive a discount for later, i.e., as available, delivery of the content.

The output module 220 of the bandwidth management system 140 can receive or read the schedule and the content and deliver or transmit the content based on the schedule. According to one embodiment, while delivering the content to the one or more destinations, the output module can control the output of content to maintain bandwidth utilization at or near a predetermined level. That is, the output module can throttle output to avoid exceeding a predetermined level, e.g., 95% of total, bandwidth utilization or may output additional content based on the schedule when bandwidth utilization is below a particular level. Stated another way, the output module 220 can be adapted to determine a current total amount of bandwidth used by both active users and inactive users of the plurality of users. The active users can be those users utilizing the content in real-time and the inactive users can be those users not utilizing the content in real-time. In response to the current total amount of bandwidth exceeding a predetermined level, downloads to destinations associated with the inactive users can be throttled. In response to the current total amount of bandwidth not exceeding the predetermined level, the content can be delivered to additional destinations based on the schedule. After throttling downloads to the destinations associated with inactive users, a new current total amount of bandwidth can be determined. In response to the new current total amount of bandwidth falling below the predetermined level, downloads to the destinations associated with inactive users can be resumed.

So, for example, a set of inactive users may be scheduled for content delivery at a specified time, as soon as possible, i.e., as bandwidth id available, etc. As noted above, delivery to these users, once initiated, may be throttled depending upon the rules of criteria for the delivery, to maintain the total amount of bandwidth utilized. However, depending upon the rules or criteria, delivery to these users may not be throttled. For example, these deliveries can be determined, based on the rules or criteria, to be high-priority delivers. In such a case, deliveries to active users may be throttled, again, depending upon the rules or criteria, to maintain the total bandwidth utilization. Regardless of whether the deliveries active or inactive users are throttled, the current total bandwidth utilization can continue to be monitored. In response to the current total amount of bandwidth not exceeding the predetermined level or falling below some other amount, the throttled deliveries can be resumed and/or content can be delivered to additional destinations based on the schedule. Additionally or alternatively, again depending upon the rules or criteria, active and/or inactive users could get more bandwidth for faster downloads. It should be noted that the rules or criteria can be applied real time. Therefore, the system can continually and in real time adjust how the content being delivered will utilize bandwidth based on the rules.

Figure 3:
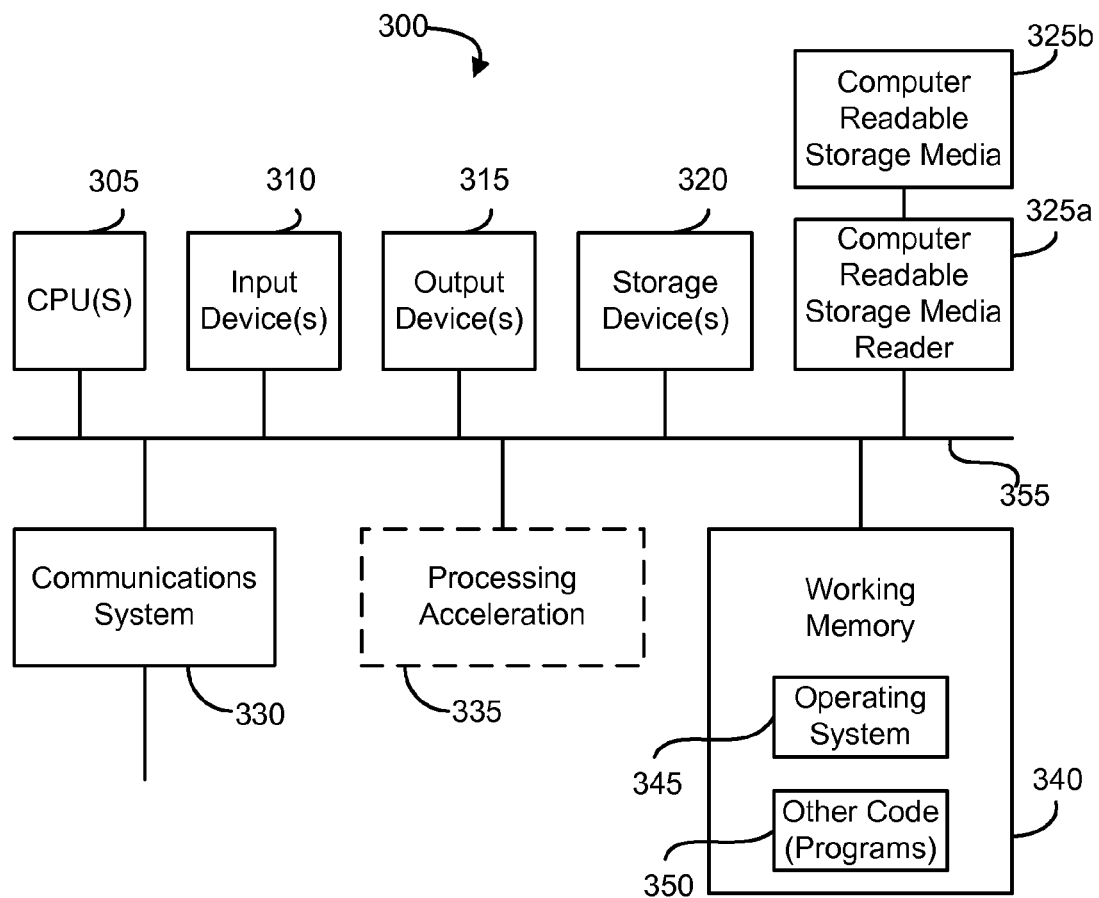
FIG. 3 is a block diagram illustrating components of an exemplary computer system upon which embodiments of the present invention may be implemented.

FIG. 3 is a block diagram illustrating components of an exemplary computer system upon which embodiments of the present invention may be implemented. For example, the system 300 illustrated here is thought to be adaptable for implementation of some or all of the CDN 201, bandwidth management module 140, or other elements of the systems described above. The computer system 300 is shown comprising hardware elements that may be electrically coupled via a bus 355. The hardware elements may include one or more central processing units (CPUs) 305; one or more input devices 310 (e.g., a scan device, a mouse, a keyboard, etc.); and one or more output devices 315 (e.g. a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above communicatively coupled with and readable by CPU(s) 305. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer or other type of device.

The computer system 300 may also comprise software elements, shown as being currently located within a working memory 340, including an operating system 345 and/or other code 350, such as an application program. The application programs may implement the methods of the invention as described herein. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Figure 4:
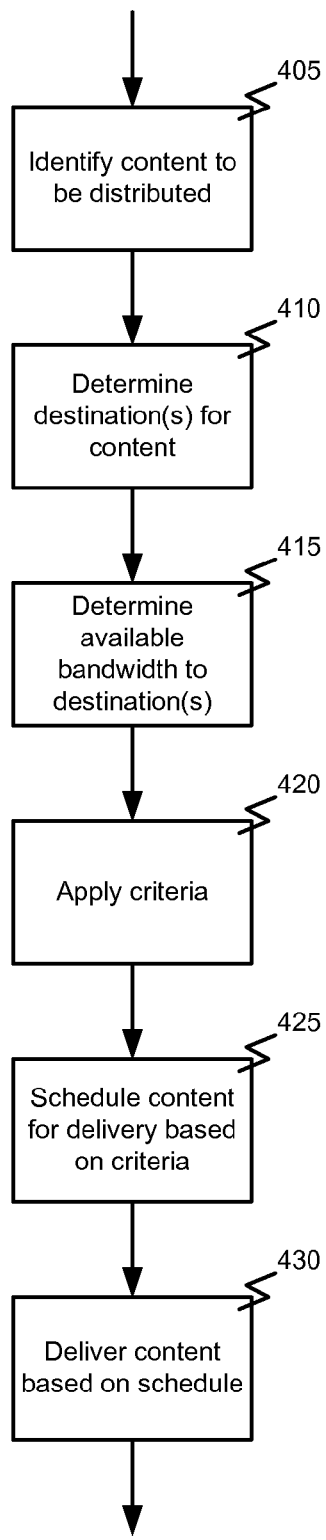
FIG. 4 is a flowchart illustrating a process for managing bandwidth utilization according to one embodiment of the present invention.

FIG. 4 is a flowchart illustrating a process for managing bandwidth utilization according to one embodiment of the present invention. In this example, the process begins with identifying 405 content to be delivered. Identifying 405 the content to be delivered can comprise receiving the content from a content source such as a CDN as described above, receiving an indication of the content to be delivered from the CDN, receiving an indication or request from a user or operator of the system, etc.

After identifying 405 the content to be distributed, one or more destinations for the content can be determined 410. Determining 410 the destinations can be based, for example on an indication, e.g., a destination address, from the CDN, an indication or address provided by a user or operator of the system, a stored indication or address for a destination or customer, etc.

Available bandwidth for delivering the content to the one or more destinations can be determined 415. As noted above, this determination 415 can be based on information maintained and relating to a particular destination indicating bandwidth available for transmission of content to a destination and can be based on known or estimated available bandwidth, e.g., based on the channel, protocol, equipment, and/or based on historical results of communications with that destination.

A set of criteria can be applied 420 to the content, the one or more destinations for the content, and the available bandwidth. For example, the criteria can comprise a predetermined limit for utilization of total bandwidth. In another example, the criteria can comprise a priority associated with at least one of the one or more destinations. In such cases, the priority can be based at least in part on a business relationship with an entity associated with the at least one destination. Additionally or alternatively, the priority can be based at least in part on an entity associated with the at least one destination paying a premium or receiving a discount for delivery of the content. In some cases, the set of criteria can comprise primary criteria and secondary criteria wherein a primary criteria is considered to be more important or takes precedence over a secondary criteria. For example, the predetermined limit for utilization of total bandwidth can comprise a primary criteria and the priority associated with the at least one destination can comprise a secondary criteria.

A schedule for delivery of the content can be generated 425 based on applying 420 the set of criteria. The content can be delivered 430 to the one or more destinations based on the schedule. As noted above, while delivering 430 the content based on the schedule, delivery can be adjusted or controlled to maintain bandwidth utilization at or near a predetermined level. That is, the output can throttled to avoid exceeding a predetermined level, e.g., 95% of total, bandwidth utilization or additional content can be output based on the schedule when bandwidth utilization is below a particular level.

Figure 5:
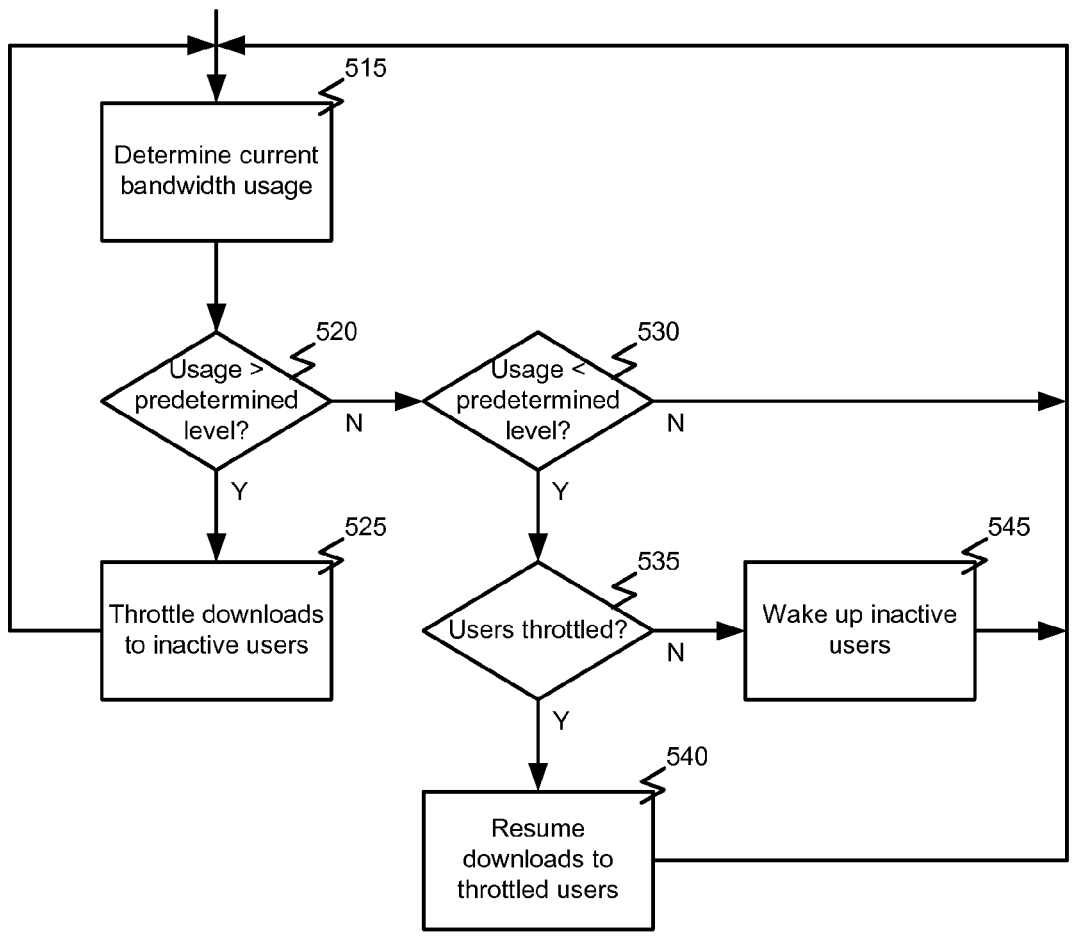
FIG. 5 is a flowchart illustrating a process for off peak background delivery of content according to a further embodiment of the present invention.

FIG. 5 is a flowchart illustrating a process for off peak background delivery of content according to one embodiment of the present invention. In this example, processing begins with determining 515 a current total amount of bandwidth used by both active users and inactive users. The active users can be considered those users who are utilizing the content in real-time. That is, the active users can be those users who are viewing, listening to, or otherwise consuming the content as it is downloading. The inactive users can be considered those users who are not utilizing the content in real-time. That is, the inactive user can be those users who are downloading content on a scheduled or other basis to be saved for later consumption.

One or more determinations 520, 530, and 535 can then be made based on the current bandwidth usage. In response to determining 520 that the current total amount of bandwidth exceeds a predetermined level, downloads to the inactive users can be throttled 525. Throttling 525 downloads to the inactive users can be achieved in any of a variety of manners such as by selecting downloads to certain users to be stopped or paused, by slowing or pausing downloads to all inactive users at once or in a round-robin fashion, or by another technique. Selection of the method used to throttle users can be based, for example, on consideration of QoS or other factors. It should be noted that in alternative embodiment, as described above, instead of or in addition to throttling 525 deliveries to inactive users, deliveries to active users may be throttled. Again, such determinations can be based on application of the rules or criteria which can be applied in real time.

In response to determining 520 that the current bandwidth usage does not exceed the predetermined level, a determination 530 can be made as to whether the bandwidth usage falls below a predetermined level. This level can be the same or different than the level for throttling inactive users. In response determining 530 that the current total amount of bandwidth falls below the predetermined level, a determination 535 can be made as to whether inactive users were previously throttled. In response to determining 535 that inactive users were previously or are currently throttled, downloads to the inactive users can be resumed 540. Resuming 540 downloads to the inactive users can be achieved by releasing or resuming some or all paused stopped downloads or by another technique.

In response to determining 530 that the current bandwidth usage does not exceed the predetermined level and determining 535 that inactive users were not or are not currently throttled, additional inactive users can be "awakened" 545 or requested. That is, additional users can be added to "fill-in" the currently unused bandwidth up to the predetermined level. Users can be added in any of a number of ways and/or based on a number of criteria. For example, users can be added based on considerations of the currently available amount of bandwidth up to the predetermined level, the amount of bandwidth available to each of those users, the QoS agreement with those users, if any, and/or other considerations.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of managing bandwidth used for delivering content to a plurality of users, the method comprising:
    determining with a content distribution system a plurality of destinations for the content, each of the plurality of destinations associated with at least one of the plurality of users, the content distribution system being remote from the plurality of destinations;
    determining with the content distribution system available bandwidth for delivering the content to the plurality of destinations;
    applying with the content distribution system a set of criteria including:
        the content,
        first requests for the content, the first requests indicating that a first portion of the plurality of destinations for the content are associated with active users that have requested that the content be streamed and utilized in real-time while the content is being streamed,
        second requests for the content, the second requests indicating that a second portion of the plurality of destinations for the content are associated with in-active users that have requested that the content be streamed in non-real-time, and
        the available bandwidth;
    generating with the content distribution system a schedule for delivery of the content based on applying the set of criteria, the schedule including deliveries to the active users and deliveries to the inactive users, wherein the first requests were generated by the active users and the second requests were generated by the inactive users;
    delivering the content from the content distribution system to the plurality of destinations based on the schedule;
    while delivering the content from the content distribution system to the plurality of destinations, determining with the content distribution system a current total amount of bandwidth used by both active users and inactive users of the plurality of users; and
    in response to the current total amount of bandwidth exceeding a predetermined level, stopping, pausing or slowing down, with the content distribution system, downloads to destinations of at least a portion of the plurality of destinations associated with the active users, but not to destinations associated with destinations associated with the inactive users, based on the set of criteria.

2. The method of claim 1, further comprising, prior to determining the plurality of destinations for the content, receiving the content from a content source.

3. The method of claim 2, wherein the content source comprises a Content Delivery Network (CDN).

4. The method of claim 1, wherein the set of criteria further comprises a predetermined limit for utilization of total bandwidth.

5. The method of claim 4, wherein the set of criteria further comprises a priority associated with at least one of the plurality of destinations.

6. The method of claim 5, wherein the priority is based at least in part on a business relationship with an entity associated with the at least one destination.

7. The method of claim 5, wherein the priority is based at least in part on an entity associated with the at least one destination paying a premium for delivery of the content.

8. The method of claim 5, wherein the priority is based at least in part on an entity associated with the at least one destination receiving a discount for delivery of the content.

9. The method of claim 5, wherein the set of criteria further comprises at least one primary criteria and at least one secondary criteria.

10. The method of claim 9, wherein the predetermined limit for utilization of total bandwidth comprises a primary criteria and the priority associated with the at least one destination comprises a secondary criteria.

11. The method of claim 1, further comprising after stopping, pausing or slowing down downloads, determining a new current total amount of bandwidth and resuming downloads associated with active users in response to the new current total amount of bandwidth falling below the predetermined level.

12. The method of claim 1, further comprising, in response to the current total amount of bandwidth not exceeding the predetermined level, delivering the content to additional destinations based on the schedule.

13. A system comprising:
    a content source computer;
    a plurality of content destination devices; and
    a content distribution computer, remote from the plurality of content destination devices, executing a bandwidth management module and communicatively coupled with the content source computer and the one or more content destination devices, wherein the bandwidth management module is adapted to:
        receive the content from the content source computer,
        identify the plurality of content destination devices,
        determine available bandwidth for delivering the content to the plurality of destination devices,
        apply a set of criteria including:
            the content,
            first requests for the content, the first requests indicating that a first portion of the plurality of destination devices are associated with active users that have requested that the content be streamed and utilized in real-time while the content is being streamed,
            second requests for the content, the second requests indicating that a second portion of the plurality of destination devices are associated with in-active users that have requested that the content be streamed in non-real-time, and
            the available bandwidth,
        generate a schedule for delivery of the content based on applying the set of criteria, the schedule including deliveries to the active users and deliveries to the inactive users, wherein the first requests were generated by the active users and the second requests were generated by the inactive users,
        deliver the content to the plurality of destination devices based on the schedule,
        while delivering the content to the plurality of content destination devices, determine a current total amount of bandwidth used by both active users and inactive users of the plurality content destination devices, and
        in response to the current total amount of bandwidth exceeding a predetermined level, stop, pause or slow down downloads to content destination devices of at least a portion of the plurality of content destination devices associated with the active users, but not to destinations associated with content destinations associated with the inactive users, based on the set of criteria.

14. The system of claim 13, wherein the content source computer comprises a Content Delivery Network (CDN).

15. The system of claim 13, wherein the set of criteria further comprises a predetermined limit for utilization of total bandwidth.

16. The system of claim 15, wherein the set of criteria further comprises a priority associated with at least one of the one or more destinations.

17. The system of claim 16, wherein the priority is based at least in part on a business relationship with an entity associated with the at least one content destination device.

18. The system of claim 16, wherein the priority is based at least in part on an entity associated with the at least one content destination device paying a premium for delivery of the content.

19. The system of claim 16, wherein the priority is based at least in part on an entity associated with the at least one content destination device receiving a discount for delivery of the content.

20. A non-transitory machine-readable medium having stored thereon a series of instructions which, when executed by a processor, causes the processor to manage bandwidth used for delivering content to a plurality of users by:
  determining a plurality of destinations for the content, each of the plurality of destinations associated with at least one of the plurality of users;
  determining available bandwidth for delivering the content to the plurality of destinations;
  applying a set of criteria including:
    the content,
    first requests for the content, the first requests indicating that a first portion of the plurality of destinations for the content are associated with active users that have requested that the content be streamed and utilized in real-time while the content is being streamed,
    second requests for the content, the second requests indicating that a second portion of the plurality of destinations for the content are associated with in-active users that have requested that the content be streamed in non-real-time, and
    the available bandwidth;
  generating a schedule for delivery of the content based on applying the set of criteria, the schedule including deliveries to the active users and deliveries to the inactive users, wherein the first requests were generated by the active users and the second requests were generated by the inactive users;
  delivering the content to the plurality of destinations based on the schedule;
  while delivering the content to the plurality of destinations, determining a current total amount of bandwidth used by both active users and inactive users of the plurality of users; and
  in response to the current total amount of bandwidth exceeding a predetermined level, stopping, pausing or slowing down, downloads to destinations of at least a portion of the plurality of destinations associated with the active users, but not to destinations associated with the inactive users, based on the set of criteria.

21. The non-transitory machine-readable medium of claim 20, wherein the set of criteria further comprises a predetermined limit for utilization of total bandwidth.

22. The non-transitory machine-readable medium of claim 21, wherein the set of criteria further comprises a priority associated with at least one of the plurality of destinations.

23. The non-transitory machine-readable medium of claim 22, wherein the priority is based at least in part on a business relationship with an entity associated with the at least one destination.

24. The non-transitory machine-readable medium of claim 22, wherein the priority is based at least in part on an entity associated with the at least one destination paying a premium for delivery of the content.

25. The non-transitory machine-readable medium of claim 22, wherein the priority is based at least in part on an entity associated with the at least one destination receiving a discount for delivery of the content.

26. The non-transitory machine-readable medium of claim 20, further comprising instructions which, when executed by the processor, cause the processor to manage bandwidth used for delivering content to a plurality of users by: after stopping, pausing or slowing down downloads to the destinations associated with the active users, determining a new current total amount of bandwidth and resuming downloads to the destinations associated with active users in response to the new current total amount of bandwidth falling below the predetermined level.

27. The non-transitory machine-readable medium of claim 20, further comprising instructions which, when executed by the processor, cause the processor to manage bandwidth used for delivering content to a plurality of users by, in response to the current total amount of bandwidth not exceeding the predetermined level, delivering the content to additional destinations based on the schedule.

* * * * *